(12) United States Patent
Schliwa et al.

(10) Patent No.: US 10,940,947 B2
(45) Date of Patent: *Mar. 9, 2021

(54) WASTE COMPACTION SYSTEM FOR A VEHICLE AND CABIN MONUMENT WITH SUCH A WASTE COMPACTION SYSTEM

(71) Applicant: AIRBUS OPERATIONS GMBH, Hamburg (DE)

(72) Inventors: Ralf Schliwa, Hamburg (DE); Marc Spille, Hamburg (DE)

(73) Assignee: Airbus Operations GmbH

( * ) Notice: Subject to any disclaimer, the term of this patent is extended or adjusted under 35 U.S.C. 154(b) by 493 days.

This patent is subject to a terminal disclaimer.

(21) Appl. No.: 15/786,442

(22) Filed: Oct. 17, 2017

(65) Prior Publication Data

US 2018/0050802 A1     Feb. 22, 2018

Related U.S. Application Data

(63) Continuation of application No. PCT/EP2016/062001, filed on May 27, 2016.

(30) Foreign Application Priority Data

May 28, 2015    (DE) ..................... 10 2015 108 442.2

(51) Int. Cl.
    *B64D 11/04*        (2006.01)
    *B64D 11/02*        (2006.01)
                (Continued)

(52) U.S. Cl.
    CPC ............. *B64D 11/04* (2013.01); *B64D 11/00* (2013.01); *B64D 11/02* (2013.01); *B65F 1/1405* (2013.01);
(Continued)

(58) Field of Classification Search
CPC ..... B64D 11/0007; B64D 11/04; B64D 11/02; B64D 2011/046
See application file for complete search history.

(56) References Cited

U.S. PATENT DOCUMENTS 4,441,873 A * 4/1984 Maccarinelli ............. B28B 7/02
                                                                                           425/64
4,444,099 A       4/1984 Paleschuck
(Continued)

FOREIGN PATENT DOCUMENTS

DE          2737122 A1    3/1978
DE         10129905 B4    1/2003
(Continued)

OTHER PUBLICATIONS

International Searching Authority, International Search Report for International Application No. PCT/EP2016/062001 dated Aug. 12, 2016.

*Primary Examiner* — Timothy D Collins
*Assistant Examiner* — Terri L Filosi
(74) *Attorney, Agent, or Firm* — Lerner, David, Littenberg, Krumholz & Mentlik, LLP

(57) ABSTRACT

A waste compaction system includes a trolley for collecting waste and a docking station that is integratable into a cabin monument of a vehicle. The trolley includes a housing with chambers for waste, an opening for introducing waste, a vacuum compaction mechanism assigned to a chamber, and a suction port accessible from outside the housing and couplable to the compaction mechanism. The compaction mechanism includes a compaction sheath extending from a bottom of the housing to a frame arranged opposite the bottom, and is fillable through the opening, and a rigid plate is arranged on or in at least one lateral surface of the compaction sheath and moves together with the compaction sheath during the evacuation thereof. The docking station (Continued)

and the trolley mate with each other. The docking station includes another suction port that is couplable to a suction line in the vehicle and the first suction port.

20 Claims, 3 Drawing Sheets

(51) Int. Cl.
  *B65F 1/14* (2006.01)
  *B64D 11/00* (2006.01)
(52) U.S. Cl.
  CPC ...... *B65F 1/1473* (2013.01); *B65F 2210/132* (2013.01); *B65F 2210/168* (2013.01); *B65F 2210/188* (2013.01)

(56) References Cited

U.S. PATENT DOCUMENTS

| | | | |
|---|---|---|---|
| 8,519,824 B1* | 8/2013 | Rankin | B64D 11/00 244/118.5 |
| 2007/0034098 A1 | 2/2007 | Labeille et al. | |
| 2008/0034987 A1 | 2/2008 | Claflin et al. | |
| 2014/0137756 A1* | 5/2014 | Lee | B30B 9/3032 100/100 |

FOREIGN PATENT DOCUMENTS

| | | |
|---|---|---|
| EP | 0668149 A2 | 8/1995 |
| EP | 1132293 B1 | 9/2004 |
| EP | 2949459 A1 | 12/2015 |

\* cited by examiner

WASTE COMPACTION SYSTEM FOR A VEHICLE AND CABIN MONUMENT WITH SUCH A WASTE COMPACTION SYSTEM

CROSS-REFERENCE TO PRIORITY APPLICATIONS

This application is a continuation of international patent application number PCT/EP2016/062001, having an international filing date of May 27, 2016, which claims priority to German patent application number DE 102015108442.2, having a filing date of May 28, 2015. The content of the referenced applications is incorporated by reference herein.

TECHNICAL FIELD

Embodiments of the invention pertain to a waste compaction system for a means of transportation, a cabin monument with such a waste compaction system, as well as a means of transportation, particularly an aircraft, that comprises a cabin and at least one such waste compaction system.

BACKGROUND

Foods and beverages are frequently consumed aboard means of transportation that serve for transporting passengers and result in waste products. Aboard passenger aircraft, in particular, these waste products are predominantly collected by the cabin personnel and have to be disposed after the end of the flight. Since the disposal at random destinations is respectively associated with disposal fees, waste products are frequently stored aboard the aircraft and subsequently disposed at a home airport.

In means of transportation intended for traveling short distances, in particular, the cabins are designed for a large number of passenger seats and only have a negligible capacity for the storage of foods and beverages and for the storage of waste products.

European patent document EP 1 132 293 B1 discloses passenger seats for aircraft that are equipped with adapters allowing the integration of waste receptacles. Although the personal storage of waste products does not require any storage options for storing the waste products produced in the entire cabin, these personal waste receptacles have to be successively emptied by cabin or cleaning personnel after the flight and the waste products subsequently have to be disposed or stored.

Receptacles for aircraft galleys, which can accommodate trash and, for example, compact the trash in order to increase the storage volume, are also known, for example, from German patent document DE 10 129 905 B4.

BRIEF SUMMARY

Therefore, it is an object of the disclosure to propose a collection device or the like which simplifies the handling of waste products in a cabin and preferably allows the temporary storage of waste products and/or the sorting of waste products, wherein neither the weight nor the complexity of the collection device is increased.

This object is met by means of a waste compaction system with the features of independent claim 1. Advantageous improvements and preferred embodiments can be gathered from the dependent claims and the following description.

It is proposed a waste compaction system for a vehicle that comprises a movable trolley for collecting waste products and a docking station that is integratable into a cabin monument of the vehicle cabin. The trolley comprises a housing with two or more chambers for accommodating waste products, at least one opening for introducing waste products, at least one vacuum compaction mechanism that is assigned to a chamber and at least one first suction port that is accessible from outside the housing and is couplable to the at least one vacuum compaction mechanism. The vacuum compaction mechanism furthermore comprises a compaction sheath that extends from a bottom of the housing to a frame arranged opposite of the bottom and is fillable through the at least one opening. A rigid plate is arranged on or in at least one lateral surface of the compaction sheath and moves together with the compaction sheath during the evacuation thereof. The docking station and the trolley are designed for mating the trolley with the docking station. The docking station comprises a second suction port that is couplable to a suction line in the vehicle and the first suction port.

The waste compaction system therefore comprises two main components that allow a particularly convenient collection of waste products in the cabin and an efficient compaction, as well as an at least temporary storage, within a very confined space, wherein the space required for the system according to the invention within the cabin can at the same time be considerably restricted. The docking station represents a fixed base for the trolley whereas the latter serves for being moved within the cabin in order to collect waste products. If the trolley is designed for use in aircraft, in particular, it may have a standard size for trolleys and accordingly be realized in the form of a "full size" trolley or a "half size" trolley.

Two or more chambers are formed in the trolley and serve for accommodating waste products. In this case, the chambers are preferably realized in such a way that they are fillable from a uniform height, which is very advantageous for ergonomic reasons. In this context, it is sensible to use two chambers that essentially extend vertically from a bottom of the trolley to an upper end and are filled, in particular, from the upper end.

A peculiarity of the trolley can be seen in that it comprises an integrated vacuum compaction mechanism that compacts the waste products collected in the trolley in a particularly effective fashion by applying a vacuum such that these waste products are compressed to a fraction of their original volume in the compaction sheath. The compression effect caused by the vacuum is also significantly intensified due to the use of the at least one rigid plate, preferably two paired rigid plates, because a deformation thereof during the compaction process may practically be ruled out such that the compaction sheath does not form any local bulges and the compressive force is very evenly applied to the waste products. A particularly high compaction force can be achieved by essentially using the entire available surface. The larger the surface of the rigid plates used for the compaction, the higher the force acting upon the waste products.

The compaction sheath may be considered a kind of bag of sorts that includes a surface-like, flexible sheet-type material and can form a closed or selectively sealable fluid-tight space. A compaction sheath has the purpose of efficiently reducing the size of a fluid-tight space by applying a vacuum and thereby evacuating air such that the compaction sheath contracts and thereby compresses the waste products located therein. The at least one opening consequently also extends into the compaction sheath that can be sealed by means of a cover or a different type of seal in order to form a fluid-tight space. Consequently, each compaction sheath should comprise its own opening for being filled with waste products. The compaction sheath is an integral component of the vacuum compaction mechanism and should be dimensioned for accommodating a sufficiently large waste disposal bag for collecting waste products in the chamber.

The seal of the compaction sheath may be realized by providing a flexible seal seat and a rigid cover that is engagable with the flexible seal seat. However, it would also be conceivable to realize the seal in a completely flexible fashion, e.g. by utilizing a continuous air-tight zipper.

The compaction sheath may comprise the at least one rigid plate on its outer side, on its inner side or in the form of an integral component in order to promote the compaction process and, in particular, the compression effect upon the waste products. The integration of the rigid plates is particularly simple on an inner side of the compaction sheath because they merely have to be fixed in their intended position at this location, but are otherwise completely enclosed by the compaction sheath. The integration into the compaction sheath, i.e. directly into its material, is also a feasible alternative, particularly when relatively thin-walled rigid plates are used. However, a particularly stable and durable connection is required if a rigid plate is bonded or laminated on an outer side of the compaction sheath in order to prevent the plate from separating on its own.

The principle according to the disclosure provides a number of advantages over known compaction systems. On the one hand, waste products or waste product types can be very easily separated from one another in the two or more chambers, namely also in a trolley that is realized in the form of a "half size" trolley and only has a small footprint. The waste products can be easily filled into one or more of the chambers through the at least one opening such that the user can sort collected waste products in accordance with the waste product types.

On the other hand, it is also possible, for example, to selectively compact one of the chambers such that the waste product volume in this chamber is reduced. In this way, the space available within the trolley is increased and can be used for collecting additional waste products in another chamber. It would furthermore be conceivable to also carry out a compaction in a second chamber after additional waste products have been collected such that several collection processes can be carried out without having to intermediately store waste products at a different location despite the use of only one small trolley.

It is furthermore conceivable to insert bags that are sealable in an air-tight fashion and are equipped with a check valve into the compaction sheaths and to seal and compact said bags after they have been filled with waste products such that small evacuated packages are created which may also be stored in a spaced-saving fashion separately of the trolley. However, it would also be conceivable to remove and separately store individual compaction sheaths in the sealed state after their compaction.

Other advantages and characteristic features of the system according to the invention may also be gathered from the embodiments described below.

In an advantageous embodiment, the chambers are respectively separated from one another by a vertical partition wall. This means that the chambers preferably are not only realized vertical to one another, but also laterally defined by a rigid wall in the form of the vertical partition wall. In this case, it may be sensible, for example, to realize adjacent chambers with only a single additional rigid plate on or in the compaction sheath, wherein this rigid plate causes the compression of the waste products in cooperation with the partition wall. In this way, the compaction mechanism and, in particular, the compaction sheath may be realized in a less complex fashion because an additional rigid plate may be eliminated.

In an advantageous embodiment, the vertical partition wall may be realized parallel to the rigid plate of the compaction sheath and movable in a direction extending orthogonal thereto, as well as selectively lockable in at least one position. When the partition wall is locked, waste products may be compacted in the above-described fashion by applying a vacuum to a compaction sheath of an adjacent chamber such that a rigid plate arranged thereon or therein moves toward the stationary vertical partition wall and waste products located in between are compressed and thereby compacted. Alternatively, it would also be possible to allow a certain mobility of the partition wall during the compaction process if this partition wall may at least temporarily be mechanically connected to the compaction sheath. Consequently, a rigid plate in or on the compaction sheath may carry out a compaction in cooperation with the vertically movable partition wall. Regardless of whether one or both aforementioned options are used, an adjustable partition wall also makes it possible to store already compacted waste products in such a space-saving fashion that only sufficient space for accommodating already compacted waste products therein remains between the vertical partition wall and an adjacent wall of the trolley housing. The space available for the remainder of the two or more chambers may thereby be enlarged such that the volume for waste products to be collected is increased.

The selective locking may be realized with a user-operated control element that may not only comprise locking pins, locking bolts, ratchet mechanisms or the like, but also electrically or electromagnetically operated locking mechanisms that may be actuated by means of electric pushbuttons, switches or a control unit in the course of a control sequence.

In another advantageous embodiment, a separate vacuum compaction mechanism may be assigned to each chamber. All chambers formed in the trolley therefore may compact waste products independently, wherein this is particularly sensible if the waste products are separated into waste product types, but also advantageous in that the available waste product storage volume is temporarily increased. The trolley may alternatively be equipped with a "passive" chamber that only allows the temporary storage of waste products.

It may be advantageous if at least one compaction sheath is completely removable from the housing as needed. In this way, the available waste product volume may be increased prior to the use of the trolley, but it would also be conceivable to store compacted waste products in the compaction sheath. To this end, the compaction sheaths may respectively comprise a handle and preferably a quick-action coupling for their speedy coupling to the first suction port. In order to ensure a secure interlock and a simple removal, it would furthermore be conceivable to provide quick-release locking means that preferably can be actuated or released with one hand by means of a control element.

It is furthermore preferred that the first suction port comprises a flexible suction line that is couplable to the interior of the compaction sheath through an opening in at least the compaction sheath, a bottom of the trolley, a lateral surface of the trolley and/or an upper side of the trolley. The flexible suction line allows a motion of the vacuum compaction mechanism relative to the trolley housing, wherein the first suction port is arranged in a fixed position relative to the trolley housing because it must be possible to couple this first suction port to a second suction port of the docking station, which in turn should be arranged in a fixed position within the docking station. The compensation of a relative motion is achieved in a particularly simple fashion with a flexible line that has a simpler construction than a rigid line comprising, for example, a displaceable seal seat. Such a flexible line should be sufficiently reinforced in order to prevent the line cross section from collapsing when a vacuum is applied. This may be realized, e.g., with annular reinforcing elements that are integrated into the material of an elastic, hose-like line within regular or irregular intervals.

The at least one first suction port may comprise several branch lines and a valve arrangement with an outlet and several inlets, wherein the branch lines are connected to the inlets and the valve arrangement is designed for selectively producing a fluidic connection with only one branch line and the outlet. This makes it possible to actuate a plurality of compaction mechanisms, which are respectively connected to one of the inlets, without modifying the first suction port or the connection to the respective chamber. It would be conceivable to provide a selector switch or several control buttons for controlling an actuation of the respective compaction mechanism on an upper side of the trolley or at a location of the trolley that is easily accessible from the upper side. It is particularly sensible to arrange the selector switch on a front side of the trolley because this front side is accessible in a position, in which the trolley is already inserted into the docking station in order to carry out the compaction. It would alternatively be sensible to provide this selector switch on a control panel that is respectively arranged on the docking station or a monument forming the docking station.

The valve arrangement may comprise, for example, a pneumatic switching valve with a number of switching positions that corresponds to the number of potential or realized chambers. The valve arrangement may be connected to the selector switch or to another control unit by means of a rod assembly. In this way, the positions of the valve arrangement and of the selector switch may be selected independently of one another. A logic circuit may be used in order to ensure sufficient operational safety, wherein this logic circuit ensures that a compaction sheath is only evacuated when it is sealed and, if applicable, equipped with a bag. Corresponding sensors, contact switches or the line, which are coupled to a control unit controlling the valve arrangement, may be used for detecting the sealed state. It would also be conceivable to provide corresponding warning signals for indicating an open seal or a missing bag such that a user can be informed accordingly and remedy the problem.

The first suction port may comprise an interface that is designed for selectively connecting the first suction port and the second suction port to one another when the trolley is mated with the docking station. The first suction port may include, for example, a pipe or line extension of sorts that is insertable into an opening of the second suction port in an optimally sealed fashion. In this context, it is also sensible to provide a funnel of sorts that significantly lowers the required positioning accuracy between the first and the second suction port.

At this point, it should be noted that the position of the first suction port is not restricted to a certain location on the trolley, but rather may be adapted in accordance with the respective requirements. For example, a first suction port may be located on an underside of a bottom of the trolley and extend outward beyond an edge of the trolley housing in order to be coupled to the second suction port. On the other hand, it may also be sensible to arrange the first suction port on or near an upper side of the trolley such that an appropriate orientation is also achieved in this case. It is particularly preferred to position the first suction port in such a way that it extends into the docking station in an inserting direction and the first suction port may be automatically coupled to the second suction port when the trolley is inserted into the docking station.

The docking station may comprise a receptacle space with at least two boundary surfaces for accommodating the trolley, wherein one of the at least two boundary surfaces carries a second suction port. In galley modules with parking spaces for several trolleys, it may occur that the boundary of a trolley is merely formed by a sidewall and a rear wall. In such instances, the second suction port should be positioned in such a boundary, particularly a rear wall surface within the galley module or another docking station.

One of the at least two boundary surfaces may comprise a guiding device for guiding the trolley. This guiding device may comprise sliding surfaces, spacers or the like which at least roughly define the moving direction of the trolley relative to the docking station. In this way, the positioning accuracy of the first suction port relative to the second suction port may be improved and fast and reliable docking of the trolley in the docking station is achieved.

At this point, it should be noted that the first and the second suction port may be respectively equipped with a separable coupling device in order to produce a reliable and permanent connection that cannot be separated, particularly during the compaction process. It is sensible to provide the trolley with an actuating device for actuating the coupling devices in order to thereby produce a connection and/or separate a connection. The coupling devices preferably interlock with one another automatically and may subsequently be separated by means of the actuating device.

The waste compaction system may furthermore comprise a drainage device for discharging liquids that originate from the waste products and accumulate in a bottom region into the suction line. Since it cannot be ruled out that the waste products contain liquids, for example from beverage or milk containers, it is particularly advantageous to once again remove these liquids from the respective compaction sheath or the bag arranged therein. In this way, excessive leakage of liquids may be prevented in case a bag is damaged during its transport or when it is rearranged.

All in all, a particularly simple, compact and lightweight waste compaction system is proposed that also provides the greatest convenience possible when it is used within a very confined space and even allows the trash separation or temporary trash storage in half size trolleys, as well as the collection of additional waste products in practically unchanged form. The weight and the complexity may be drastically reduced in comparison with conventional compaction systems in that the suction line is connected to a vacuum system of the vehicle that supplies, for example, lavatories or devices producing wastewater with a vacuum.

The disclosure furthermore pertains to a cabin monument with a suction line and such a waste compaction system.

The cabin monument may furthermore comprise at least one lavatory that is coupled to the suction line. In an aircraft, in particular, the lavatory is connected to a vacuum system that may dispose liquids and waste products in a particularly reliable and mechanically simple fashion. The suction line provided in such a vacuum system may be easily coupled to the waste compaction system according to the invention in order to carry out a compaction.

The docking station of the waste compaction system may be realized in the form of a modified stowage compartment or a trolley parking space in a cabin monument and is couplable to a suction line extending through the cabin monument or in the vicinity of the cabin monument. The cabin monument may particularly include a galley monument, a lavatory monument or a combination thereof.

The disclosure also pertains to an aircraft that comprises a vacuum system with a suction line, as well as a waste compaction system and a cabin monument, into which the suction line extends.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of exemplary embodiments and the figures. In this respect, all described and/or graphically illustrated characteristics form the object of the disclosure individually and in arbitrary combination, namely regardless of their composition in the individual claims or their references to other claims. In the figures, identical or similar objects are furthermore identified by the same reference symbols.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
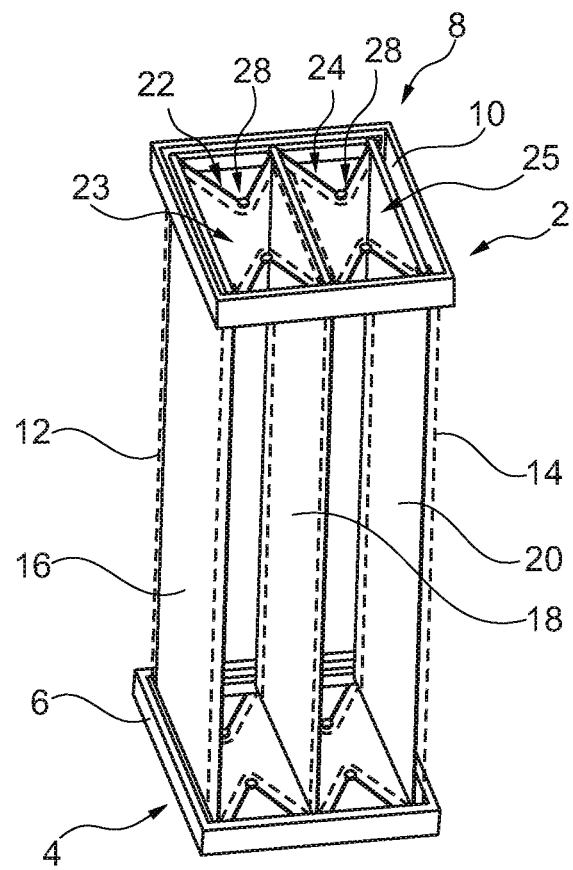
FIG. 1 shows a three-dimensional view of a trolley.

FIG. 1 shows a trolley 2 of a waste compaction system in the form of a schematic three-dimensional representation that is highly simplified due to the partial omission of a housing. This figure shows a bottom 4 that comprises an exemplary frame 6 carrying not-shown rollers for the movement on the floor and a cover plate, a closable opening or the like as a delimitation from the floor. An upper side 8 of the trolley 2 likewise comprises a frame 10 that faces a user. Two flexible compaction sheaths 12 and 14 having a surface-like material are supported between the frames 6 and 10, wherein said compaction sheaths are sealable in a fluid-tight fashion and serve for accommodating a waste disposal bag, in which waste products are collected. Rigid plates 16, 18 and 20 are also schematically illustrated in this figure, wherein these plates are arranged parallel to and at a distance from one another and supported in the lower frame 6, as well as in the upper frame 10. These plates preferably extend over the largest possible surface of the respective compaction sheaths 12 and 14 and are planar in order to exert the greatest and most uniform force possible upon the waste products as described further below. Two chambers 22 and 24 with respective upwardly directed openings 23 and 25 are formed in cooperation with the compaction sheaths 12 and 14, wherein rigid plates 16 and 20 respectively form the boundary of said chambers toward the outside and the chambers are separated from one another by the central rigid plate 18. The respective plates 16 and 18 or 18 and 20 are the corresponding compaction sheaths 12 and 14 respectively form a vacuum compaction mechanism.

The trolley 2 respectively accommodates a bag in a chamber 22 or 24 in order to collect waste products therein and of subsequently compacting this bag. In order to compact the collected waste products, the corresponding compaction sheath 12 or 14 is evacuated by applying a vacuum such that it contracts and compresses the waste products located therein. As initially mentioned, at least one of the respective rigid plates 16 and 18 or 18 and 20 is preferably arranged within the corresponding compaction sheath 12 or 14. If one of the respective rigid plates 16 and 18 or 18 and 20 or both plates are simultaneously movable in one of the respective chambers 22 or 24, at least one of the rigid plates 16, 18 or 20 can carry out a motion that follows the respective compaction sheath 12 or 14 during an evacuation of the corresponding compaction sheath 12 or 14, wherein the respective other rigid plate is mechanically connected to the corresponding compaction sheath 12 or 14 in order to prevent the compensation of a contracting motion of the corresponding compaction sheath 12 or 14.

The evacuation creates a significant pressure differential between an outer side and the interior of the corresponding compaction sheath 12 or 14, wherein this pressure differential manifests itself in the form of a force upon the rigid plates 16, 18 or 20 that in turn acts upon the waste products in the form of a counterforce. It may therefore suffice to arrange one of the respectively associated rigid plates 16 and 18 or 18 and 20 immovably in order to compact the waste products in one of the chambers 22 or 24, but the respectively opposite plate must remain movable. However, it always has to be ensured that both respectively associated plates 16 and 18 or 18 and 20 are mechanically connected to the corresponding compaction sheath 12 or 14 such that they approach one another and thereby compact the waste products located in between.

It would be conceivable to use a waste disposal bag with a check valve for the collection of waste products, wherein air can escape through said check valve during the compaction process, but is subsequently not admitted into the bag again. Consequently, the waste disposal bag remains in the corresponding chamber 22 or 24 in the form of a flat packet and can also maintain its compact shape therein after the separation from the docking station. In order to accommodate bags of any type, the upper frame 10 may comprise corresponding means that allow, in particular, a clamped retention of the respective bag.

Figure 2:
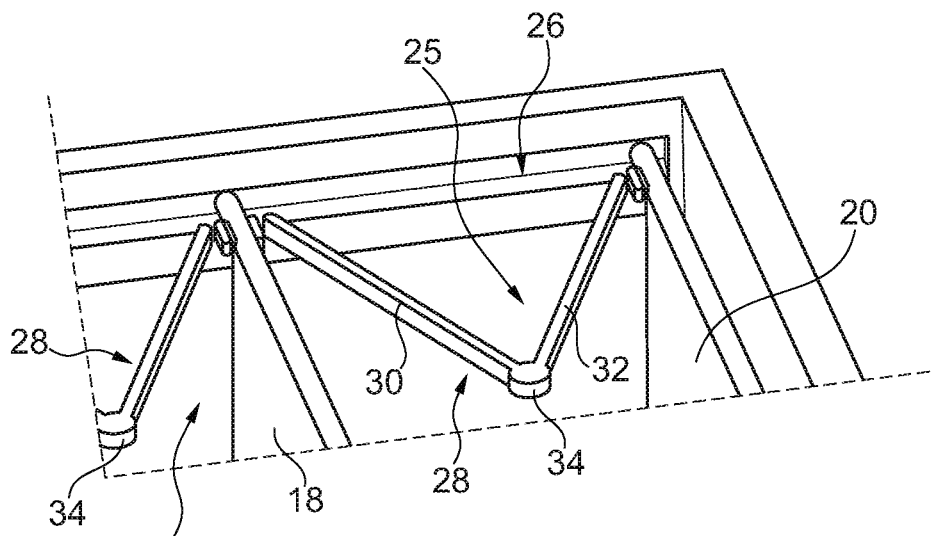
FIG. 2 shows a detail of the trolley in the form of an enlarged three-dimensional representation.

According to the detail illustrated in FIG. 2, the upper frame 10 provides a guiding device 26, in which the rigid plates 16, 18 and 20 are supported such that they are displaceable in a preferably horizontal plane defined by the upper frame 10, but also locked as needed by means of not-shown locking devices that are manually or electrically releasable. A lever mechanism 28 is respectively arranged between receptacle points for the rigid plates 16, 18 and 20, wherein said lever mechanism includes two rods 30 and 32 that are connected to one another in an articulated fashion and comprise a common joint 34 that protrudes into the respective chamber 22 or 24. These lever mechanisms may promote the compacting motion of a compaction sheath 12 or 14, e.g., in that they laterally compress the corresponding compaction sheath 12 or 14 when the respective plates 16 and 18 or 18 and 20 associated with the respective chamber 22 or 24 move toward one another.

Figure 3:
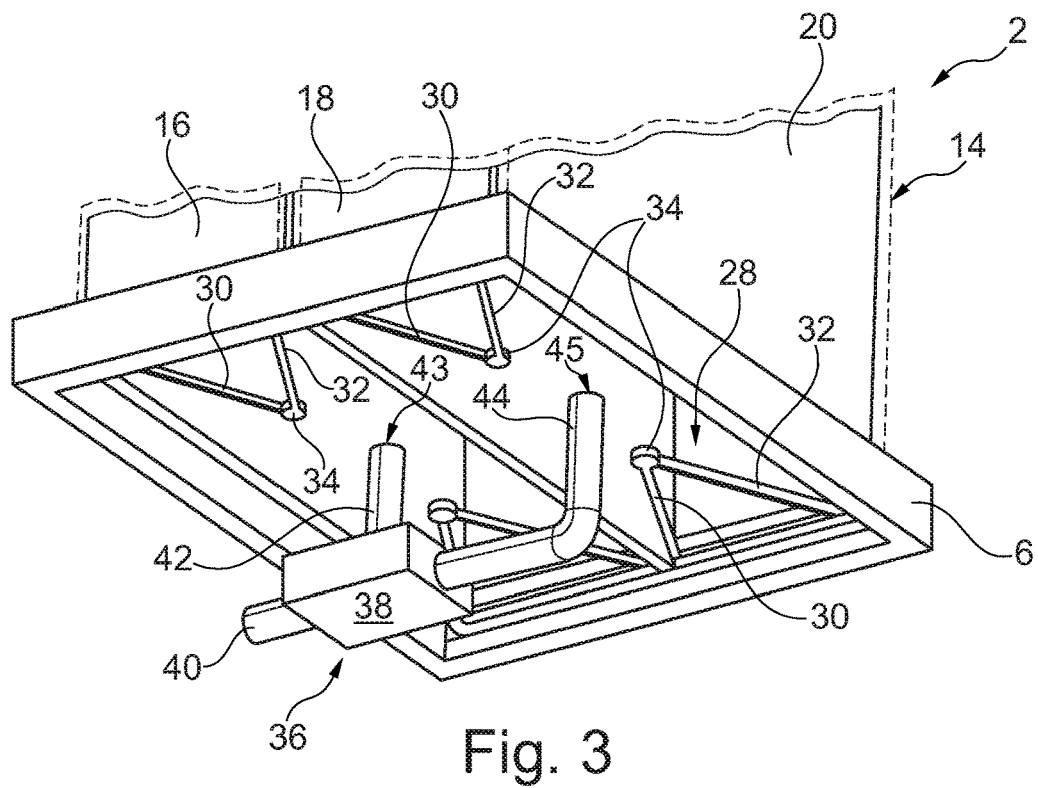
FIG. 3 shows an underside of the trolley, on which the first suction port is arranged as an example.

FIG. 3 shows an underside of the trolley 2 in the form of a three-dimensional representation. This figure shows a first suction port 36 that is respectively coupled to the chambers 22, 24 and the compaction sheaths 12 and 14 located therein. The valve arrangement 38 makes it possible to selectively couple an outlet 40 to only one of several branch lines 42 and 44 that serve as suction lines and are respectively assigned to one of the chambers 22 and 24. The outlet 40 horizontally extends beyond the contour of the trolley 2 and is designed for being coupled to a correspondingly shaped (not-shown) second suction port.

For example, the branch lines 42 and 44 are realized elastically and have a certain mobility in the horizontal direction such that the respective branch line 42 or 44 can follow a relative motion of the corresponding compaction sheath 12 or 14 during a compaction process. A series of not-shown reinforcing elements can be used in order to provide the branch lines 42 and 44 with sufficient stability, wherein said reinforcing elements are located on an outer side, an inner side or in the material of the respective branch lines 42 and 44. For example, the branch lines 42 and 44 are routed into the respective compaction sheaths 12 and 14 through corresponding openings 43, 45 on their underside.

Figure 4:
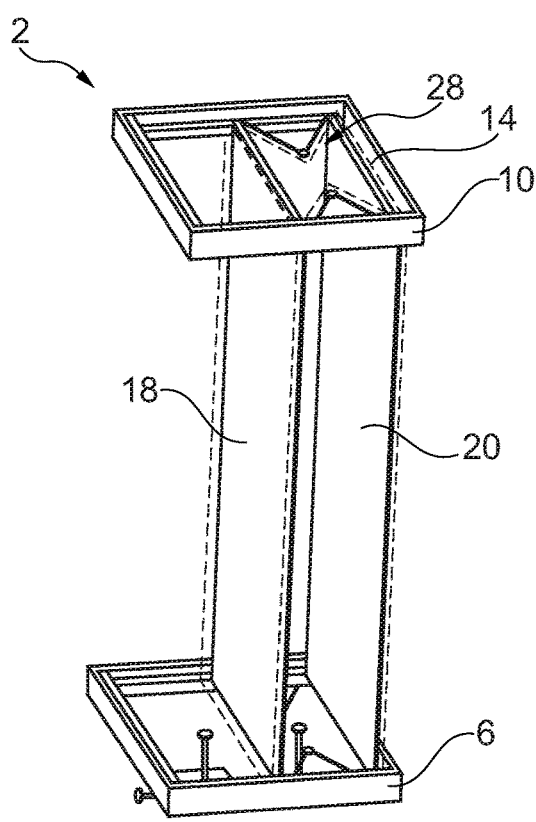
FIG. 4 shows the trolley with a removed chamber.

FIG. 4 shows the trolley 2 in a state, in which one chamber 22 is removed, e.g., in order to temporarily enlarge the space available for collecting waste products in the second chamber 24. It would be conceivable to ensure a smooth function in that the central plate 18, which act as a partition wall, is vertically divided into two plate halves that lie parallel and flush on top of one another or in that each chamber 22 and 24 comprises its own rigid plate 18 that is directed toward the respective other chamber 24 or 22. In this case, only one of the plate halves remains in the trolley 2 when one of the chambers 22 or 24 is removed.

Figure 5:
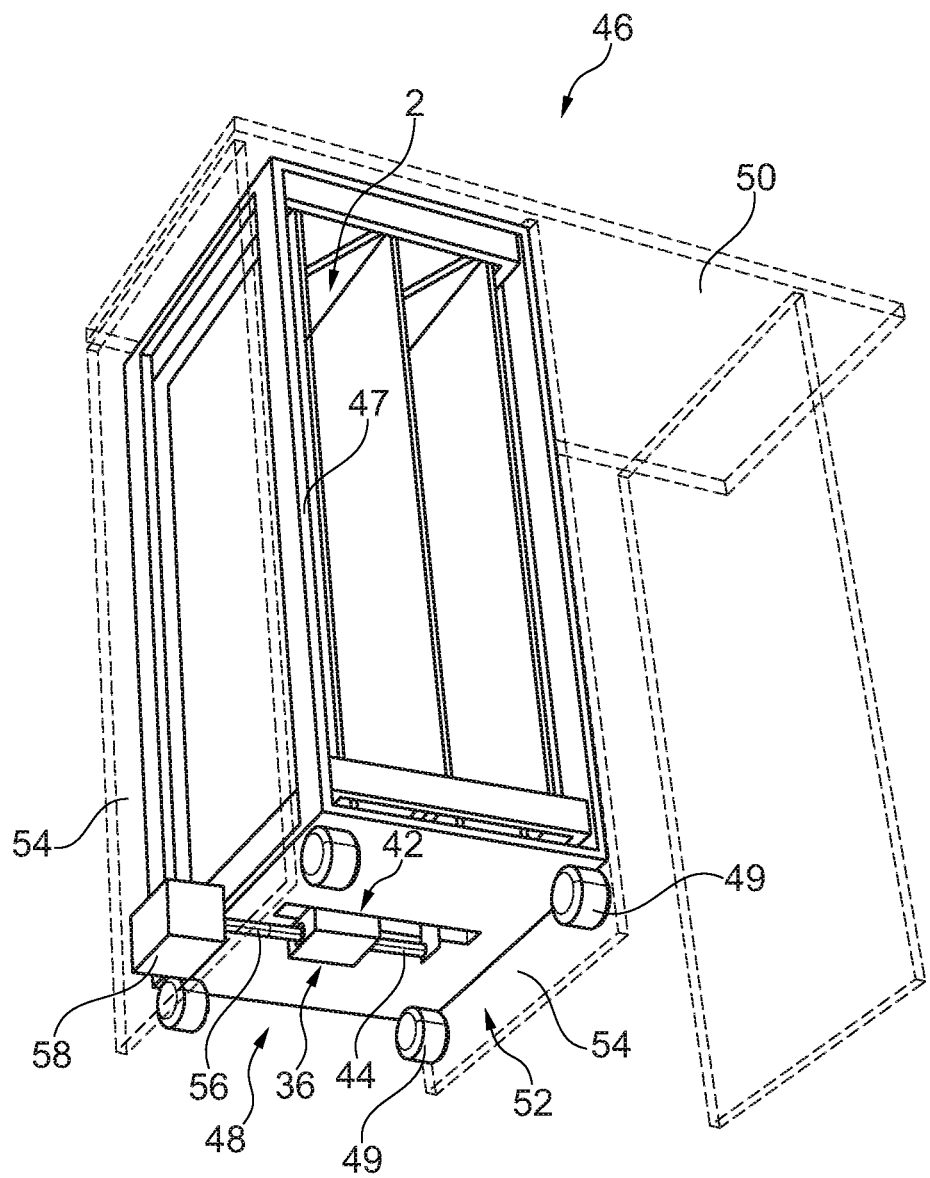
FIG. 5 shows a schematic representation of the system according to an embodiment of the invention.

FIG. 5 ultimately shows a waste compaction system 46 with a trolley 2 that in this figure comprises a housing 47 with rollers 49 arranged on the underside thereof and is located in a docking station 48. This docking station is integrated into a partially illustrated cabin monument 50 and, for example, has such dimensions that it can securely and completely accommodate the trolley 2. In order to securely interlock with the trolley, the docking station 48 may comprise locking means that are not explicitly illustrated, but may be designed in a manner familiar to a person skilled in the art. The trolley 2 corresponds to the trolley in the preceding figures and, for example, has a size that is conventionally referred to as a "half-size" trolley.

The docking station 48 comprises a receptacle space 52 for accommodating the trolley 2, wherein this receptacle space is at least defined, for example, by two sidewalls 54 that are arranged parallel to and at a distance from one another. A second suction port 56 is arranged on the left sidewall 54 in the plane of projection and connected to a controllable purge valve 58 that in turn is connected to a not-shown suction line installed in the vehicle. When the purge valve 58 is opened, the suction line is connected to the second suction port 56 such that a compaction may be carried out by respectively evacuating air from a branch line 42 or 44 through the first suction port 36 and the valve arrangement 38 positioned thereon. Its outlet 40 may once again be fluidically connectable to the second suction port 56 in a mechanical fashion, e.g. by means of a suitable coupling.

The waste compaction system 46 according to an embodiment of the invention has a particularly compact and efficient construction that is also suitable for accommodating larger quantities of waste products and, if so required, allows their compaction and removal in order to intermediately store the waste products.

As a supplement, it should be noted that "comprising" does not exclude any other elements or steps, and that "a" or "an" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A waste compaction system for a vehicle, comprising:
a movable trolley for collecting waste products; and
a docking station that is integratable into a cabin monument of the vehicle cabin;
wherein the trolley comprises a housing with two or more chambers for accommodating waste products, at least one opening for introducing waste products into the two or more chambers, at least one vacuum compaction mechanism that is assigned to one of the two or more chambers, and at least one first suction port that is accessible from outside the housing and is couplable to the at least one vacuum compaction mechanism;
wherein the at least one vacuum compaction mechanism comprises a flexible compaction sheath, which extends from a bottom of the housing to a frame arranged opposite of the bottom and is fillable through the at least one opening, and a rigid plate arranged on or in at least one lateral surface of the flexible compaction sheath and configured to move together with the flexible compaction sheath during an evacuation of the flexible compaction sheath;
wherein the docking station and the trolley are configured for mating the trolley with the docking station; and
wherein the docking station comprises a second suction port that is couplable to a suction line in the vehicle and the first suction port.

2. The waste compaction system of claim 1, wherein the chambers are respectively separated from one another by a vertical partition wall.

3. The waste compaction system of claim 2, wherein the rigid plate of the compaction sheet is planar, wherein the vertical partition wall is parallel to the rigid plate of the flexible compaction sheath, and is movable from a first position at a first distance from the rigid plate in a direction extending orthogonal thereto to a second position at a second distance from the rigid plate, and is selectively lockable in at least the first position or the second position.

4. The waste compaction system of claim 2, wherein a vacuum compaction mechanism is assigned to each chamber.

5. The waste compaction system of claim 1, wherein at least one flexible compaction sheath is completely removable from the housing as needed.

6. The waste compaction system of claim 1, wherein the at least one first suction port comprises a flexible suction line that is couplable to the interior of a corresponding flexible compaction sheath through an opening in at least the corresponding flexible compaction sheath, a bottom of the trolley, a lateral surface of the trolley and/or an upper side of the trolley.

7. The waste compaction system of claim 1, wherein:
the at least one first suction port comprises several branch lines and a valve arrangement with an outlet and several inlets; and
the branch lines are connected to the inlets and the valve arrangement is designed for selectively producing a fluidic connection with only one branch line and the outlet.

8. The waste compaction system of claim 1, wherein the first suction port comprises an interface that is designed for selectively connecting the first suction port and the second suction port to one another when the trolley is mated with the docking station.

9. The waste compaction system of claim 1, wherein the docking station comprises a receptacle space with at least two boundary surfaces and one of the at least two boundary surfaces carries the second suction port.

10. The waste compaction system of claim 9, wherein at least one of the at least two boundary surfaces comprises a guiding device for guiding the trolley.

11. The waste compaction system of claim 1, further comprising a drainage device for discharging liquids that originate from the waste products and accumulate in a bottom region into the suction line.

12. The waste compaction system of claim 1, wherein the flexible compaction sheath includes a seal for closing the at least one opening of the flexible compaction sheath to form a fluid-tight space inside of the flexible compaction sheath.

13. The waste compaction system of claim 1, wherein the flexible compaction sheath defines a selectively sealable fluid-tight space and wherein the rigid plate is located in the selectively sealable fluid-tight space.

14. The waste compaction system of claim 1, wherein:
the flexible compaction sheath has a bottom end adjacent the bottom of the housing and a top end defining the at least one opening; and
the rigid plate extends continuously from the bottom end of the flexible compaction sheath to the top end of the flexible compaction sheath.

15. The waste compaction system of claim 1, wherein: the flexible compaction sheath has a bottom end adjacent the bottom of the housing and a top end defining the at least one opening;
a bottom portion of the rigid plate is located adjacent the bottom end of the flexible compaction sheath;
a top portion of the rigid plate is located adjacent the top end of the flexible compaction sheath; and
the bottom portion of rigid plate and the top portion of the rigid plate move together with the flexible compaction sheath during the evacuation of the flexible compaction sheath.

16. The waste compaction system of claim 1, wherein:
the flexible compaction sheath has a bottom end adjacent the bottom of the housing and a top end defining the at least one opening;
a bottom portion of the rigid plate is located adjacent the bottom end of the flexible compaction sheath;
a top portion of the rigid plate is located adjacent the top end of the flexible compaction sheath;
the rigid plate extends continuously from the bottom portion to the top portion; and
the bottom portion of the rigid plate and the top portion of the rigid plate move together with the flexible compaction sheath during the evacuation of the flexible compaction sheath.

17. The waste compaction system of claim 1, wherein:
the flexible compaction sheath has a first side and an opposite second side;
each side of the flexible compaction sheet extends from the bottom of the housing to the frame arranged opposite of the bottom;
the rigid plate comprises a first rigid plate arranged adjacent the first side and a second rigid plate arranged adjacent the second side;
the first rigid plate and the second rigid plate move together with the flexible compaction sheath during the evacuation of the flexible compaction sheath; and
the waste compaction system consists of no more than two rigid plates that move together with the compaction sheath during the evacuation of the flexible compaction sheath.

18. A cabin monument for a vehicle, comprising a suction line and a waste compaction system, the waste compaction system comprising:
a movable trolley for collecting waste products; and
a docking station that is integratable into the cabin monument;
wherein the trolley comprises a housing with two or more chambers for accommodating waste products, at least one opening for introducing waste products into the two or more chambers, at least one vacuum compaction mechanism that is assigned to one of the two or more chambers, and at least one first suction port that is accessible from outside the housing and is couplable to the at least one vacuum compaction mechanism;
wherein the vacuum compaction mechanism comprises a flexible compaction sheath, which extends from a bottom of the housing to a frame arranged opposite of the bottom and is fillable through the at least one opening, and a rigid plate arranged on or in at least one lateral surface of the flexible compaction sheath and configured to move together with the flexible compaction sheath during evacuation of the flexible compaction sheath;
wherein the docking station and the trolley are configured for mating the trolley with the docking station; and
wherein the docking station comprises a second suction port that is couplable to a suction line in the vehicle and the first suction port.

19. The cabin monument of claim 18, further comprising at least one lavatory that is coupled to the suction line.

20. An aircraft comprising:
a vacuum system with a suction line;
a waste compaction system; and a cabin monument into which the suction line extends, the waste compaction system comprising:
a movable trolley for collecting waste products; and
a docking station that is integratable into the cabin monument;
wherein the trolley comprises a housing with two or more chambers for accommodating waste products, at least one opening for introducing waste products into the two or more chambers, at least one vacuum compaction mechanism that is assigned to one of the two or more chambers, and at least one first suction port that is accessible from outside the housing and is couplable to the at least one vacuum compaction mechanism;
wherein the vacuum compaction mechanism comprises a flexible compaction sheath, which extends from a bottom of the housing to a frame arranged opposite of the bottom and is fillable through the at least one opening, and a rigid plate arranged on or in at least one lateral surface of the flexible compaction sheath and configured to move together with the flexible compaction sheath during evacuation of the flexible compaction sheath;
wherein the docking station and the trolley are configured for mating the trolley with the docking station; and
wherein the docking station comprises a second suction port that is couplable to a suction line in the vehicle and the first suction port.

* * * * *